United States Patent [19]

Petzold et al.

[11] Patent Number: 5,189,611
[45] Date of Patent: Feb. 23, 1993

[54] TEMPERATURE COMPENSATION TECHNIQUE FOR A CONTINUOUSLY VARIABLE TRANSMISSION CONTROL SYSTEM

[75] Inventors: Werner P. Petzold, Harwood Heights, Ill.; William P. Umlauf, Schererville, Ind.

[73] Assignee: Borg-Warner Automotive, Inc., Sterling Heights

[21] Appl. No.: 488,436

[22] Filed: Feb. 27, 1990

Related U.S. Application Data

[63] Continuation of Ser. No. 370,129, Jun. 20, 1989, abandoned, which is a continuation of Ser. No. 25,392, Mar. 13, 1987, abandoned.

[51] Int. Cl.$^5$ .............................................. B60K 41/18
[52] U.S. Cl. ................................. 364/424.1; 74/866
[58] Field of Search ............... 364/424.1, 557, 571.02; 74/866

[56] References Cited

U.S. PATENT DOCUMENTS

| | | | |
|---|---|---|---|
| 4,509,124 | 4/1985 | Suzuki et al. | 74/866 |
| 4,542,665 | 9/1985 | Yamamuro et al. | 74/866 |
| 4,566,354 | 1/1986 | Kumura et al. | 364/424.1 |
| 4,710,879 | 12/1987 | Vahabzadeh | 364/424.1 |
| 4,720,800 | 1/1988 | Suzuki et al. | 364/571 |
| 4,729,264 | 3/1988 | Sakai | 74/867 |

Primary Examiner—Vincent N. Trans
Attorney, Agent, or Firm—Willian Brinks Olds

[57] ABSTRACT

Temperature compensation techniques are utilized to provide consistent system response in a continuously variable transmission system or other control system over a range of expected operating temperatures. Variations in the independent transfer functions for various control functions, such as ratio control, line pressure control and clutch control are monitored or measured. Appropriate modifications to system operating parameters are scheduled based upon the measured, simulated or predicted variations in the transfer functions as previously determined. In operation, the disclosed system senses temperature and provides the appropriate compensation and gain parameter modifications in accordance with the selected schedules.

15 Claims, 11 Drawing Sheets

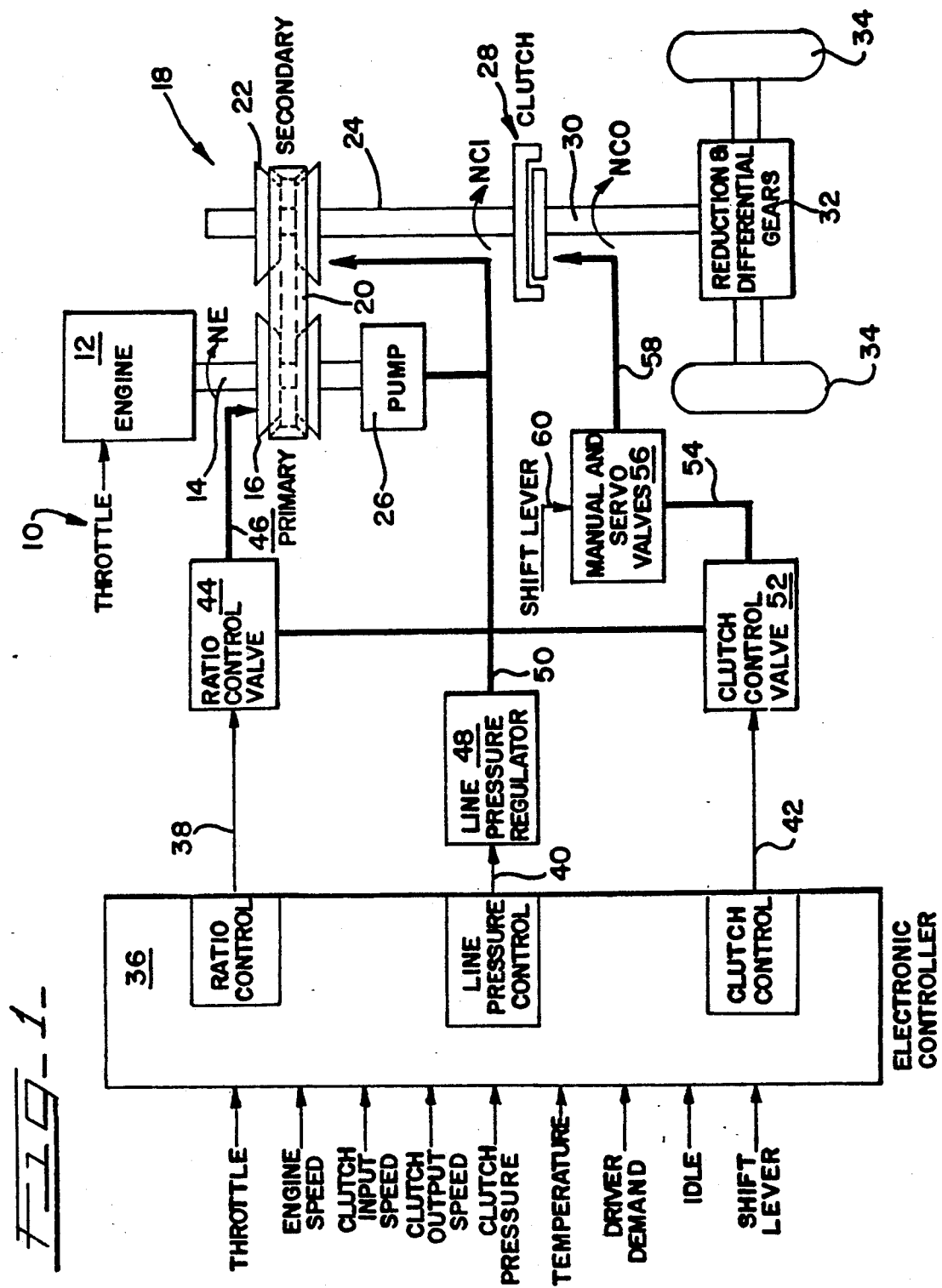

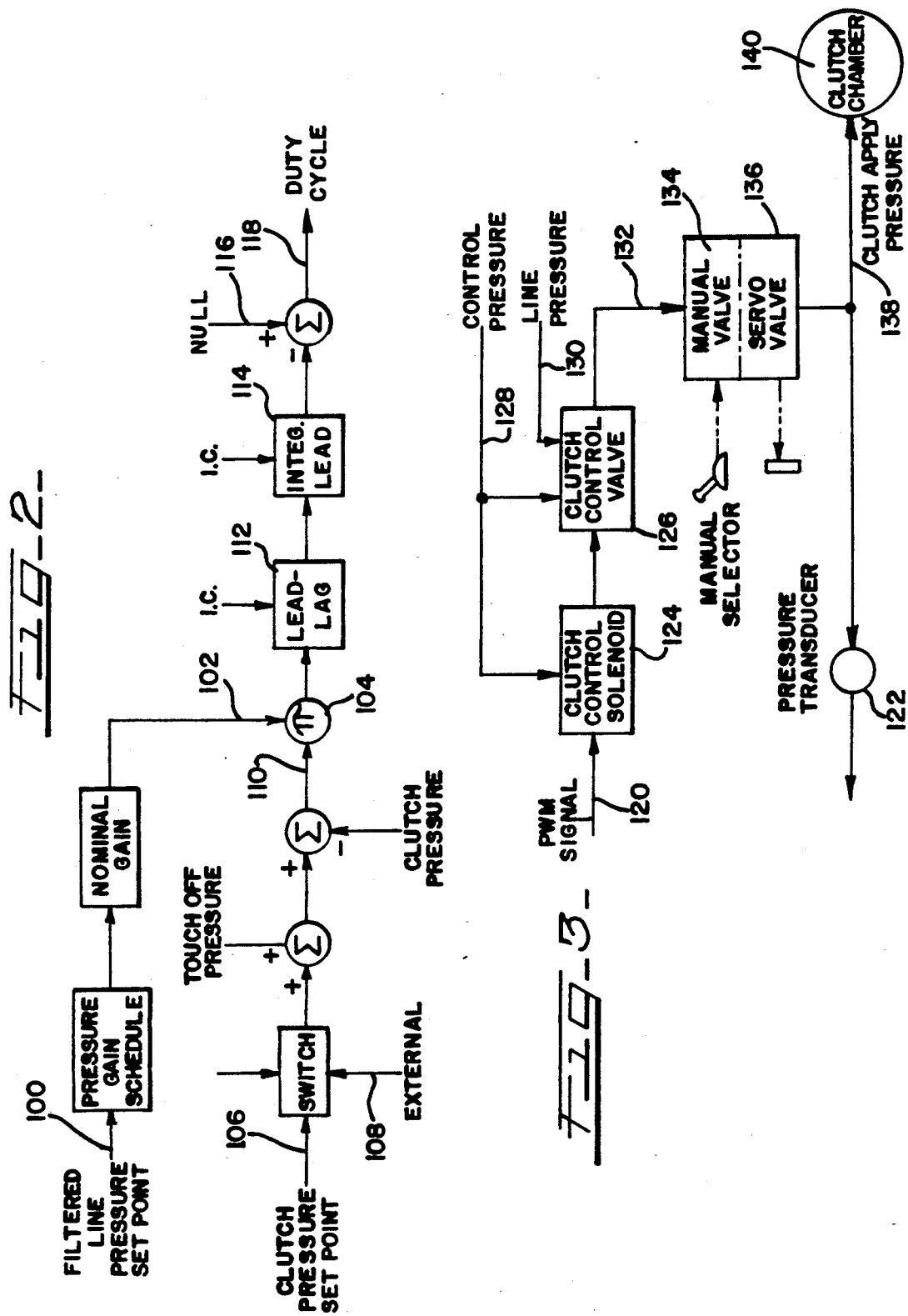

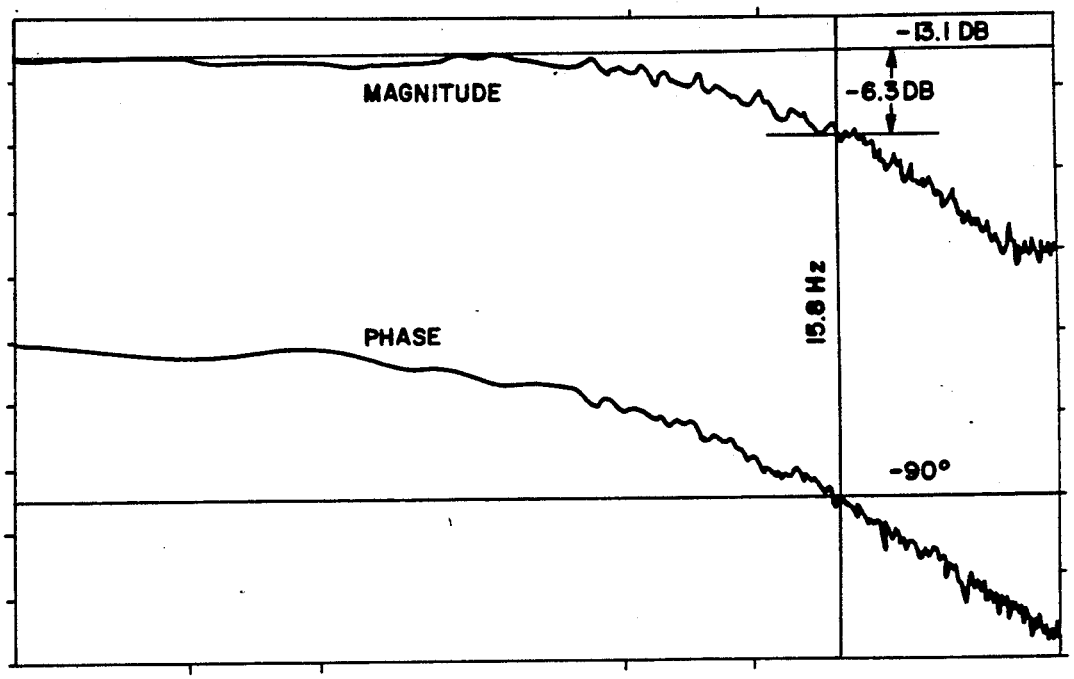
Fig-4-
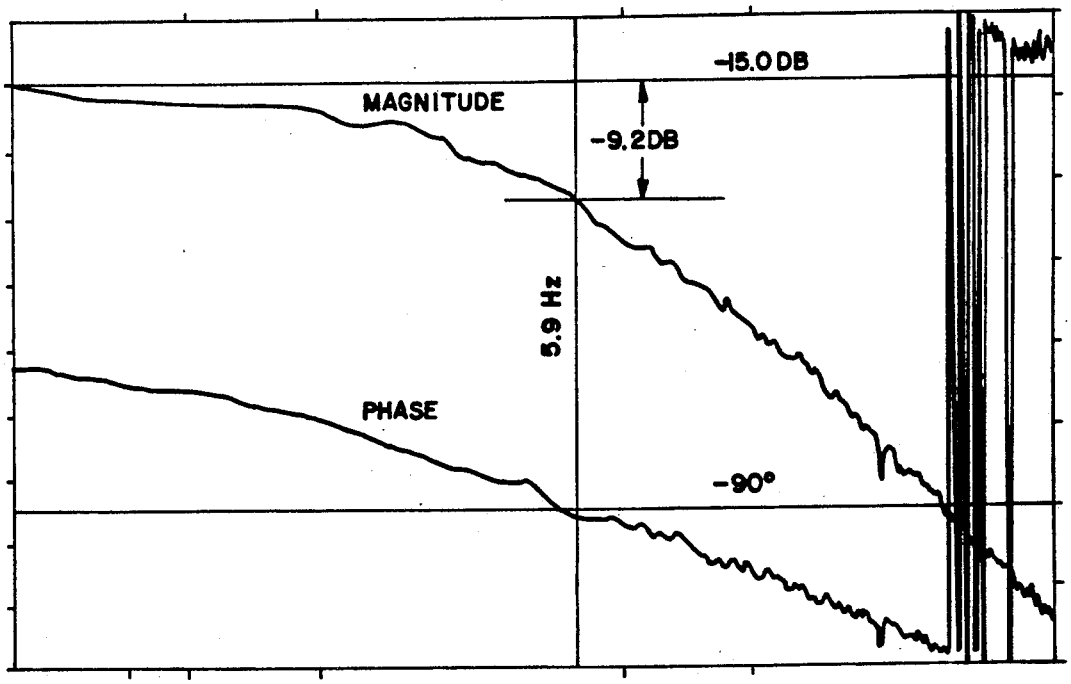
Fig-5-

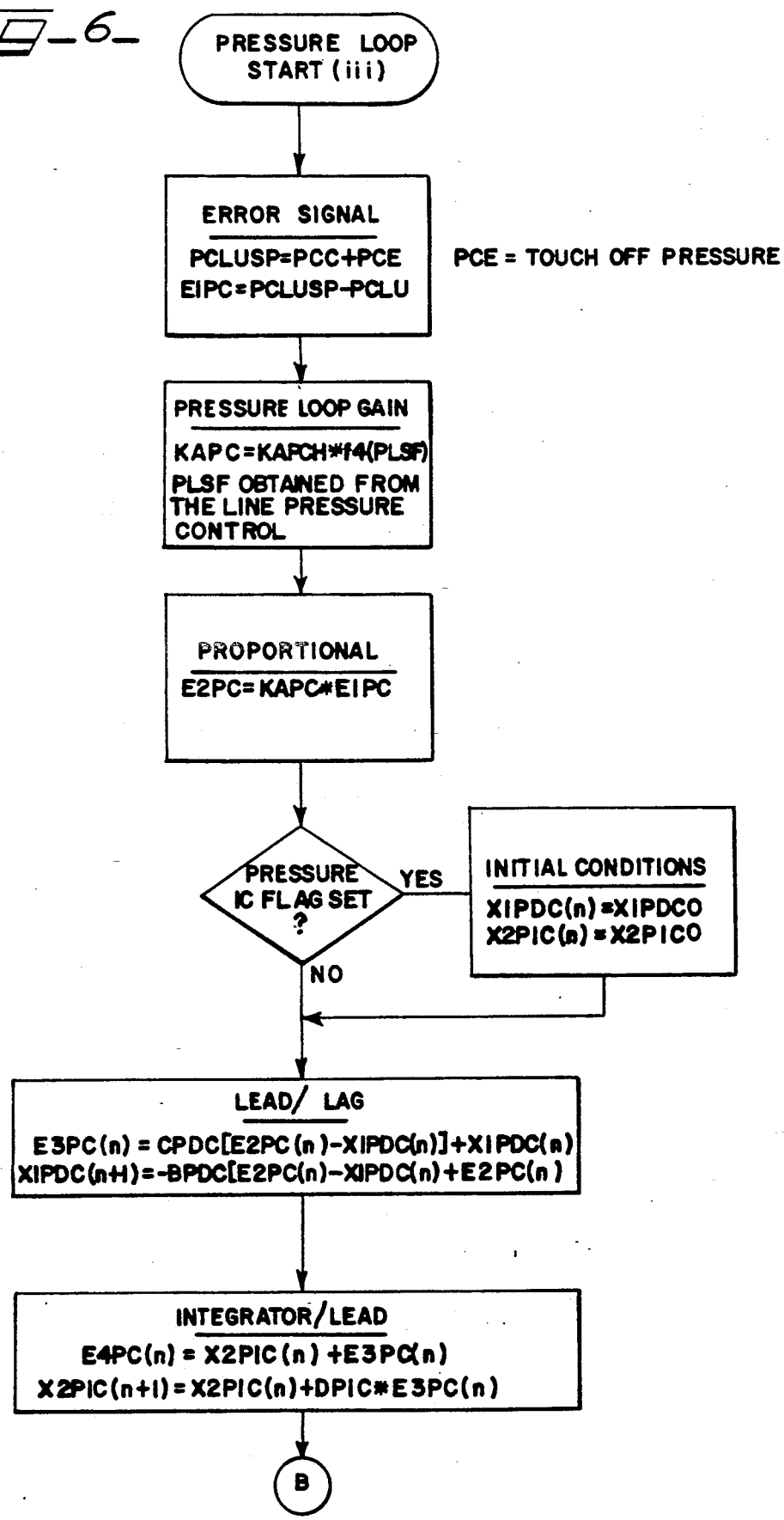

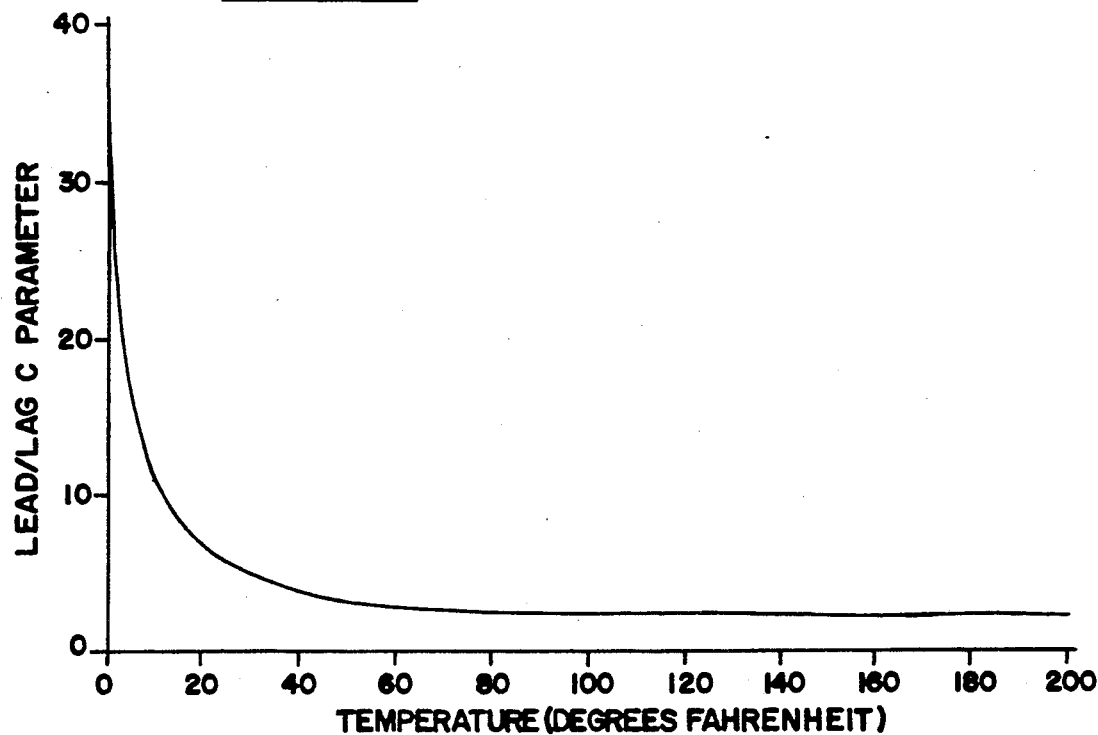
FIG-7-
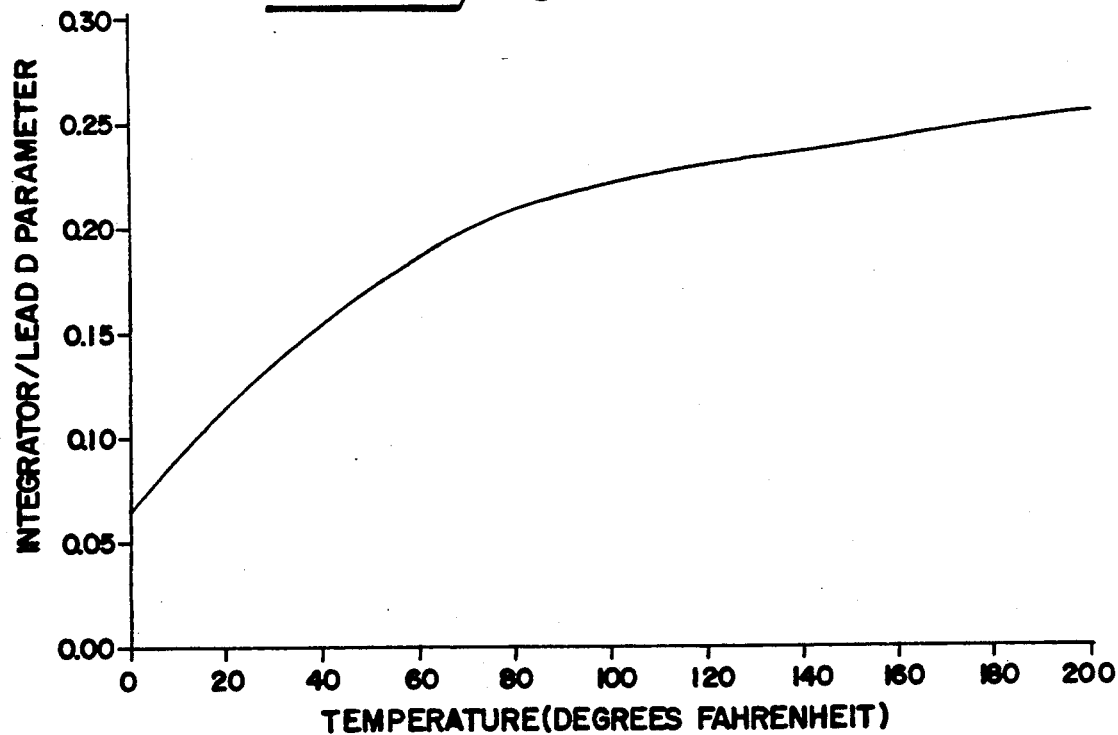
FIG-8-

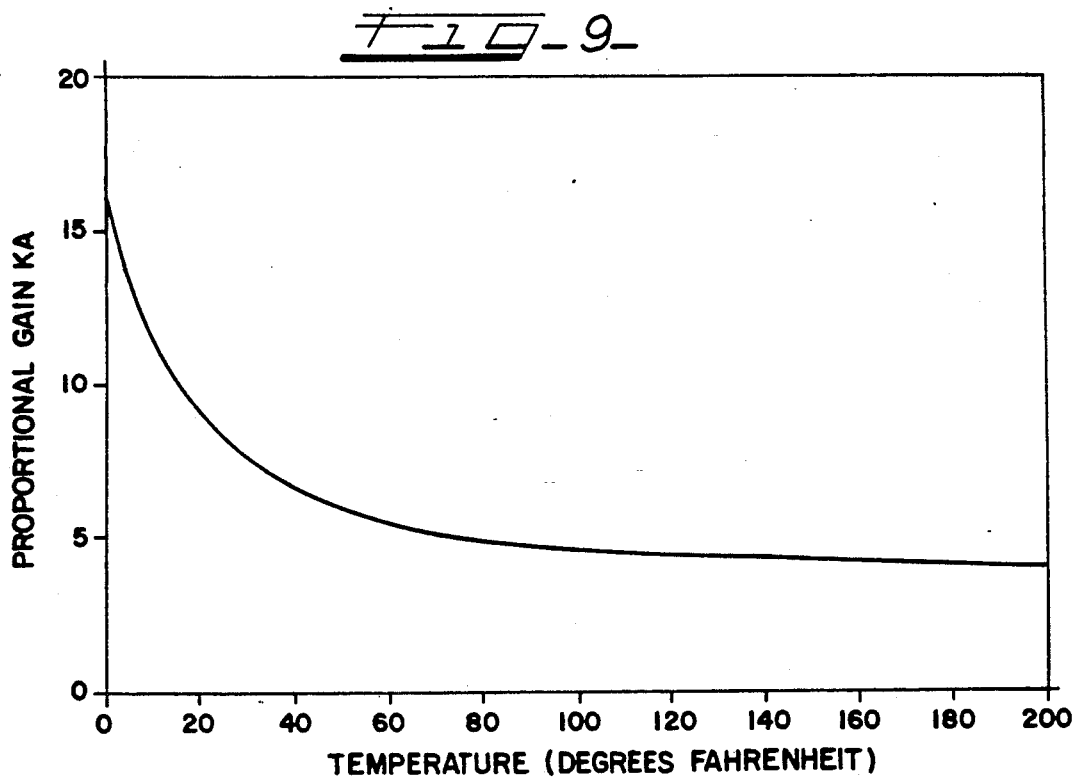
FIG-9-
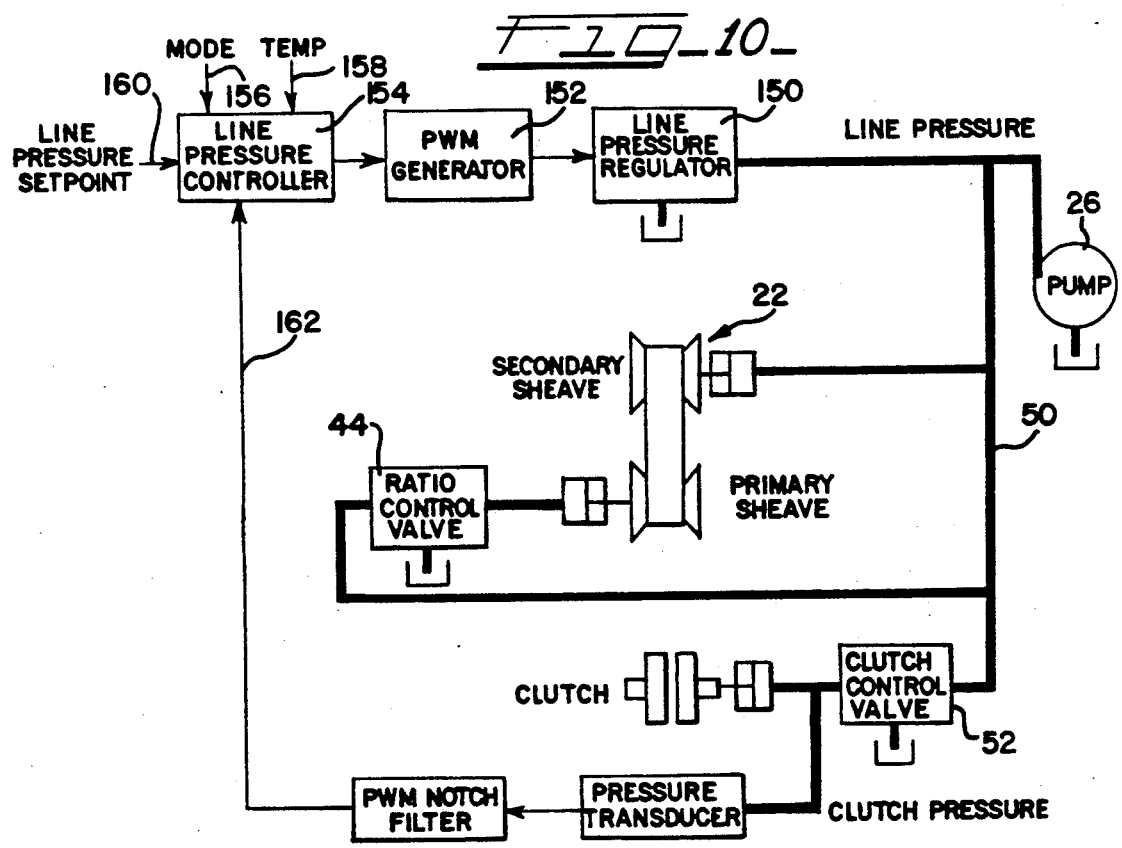
FIG-10-

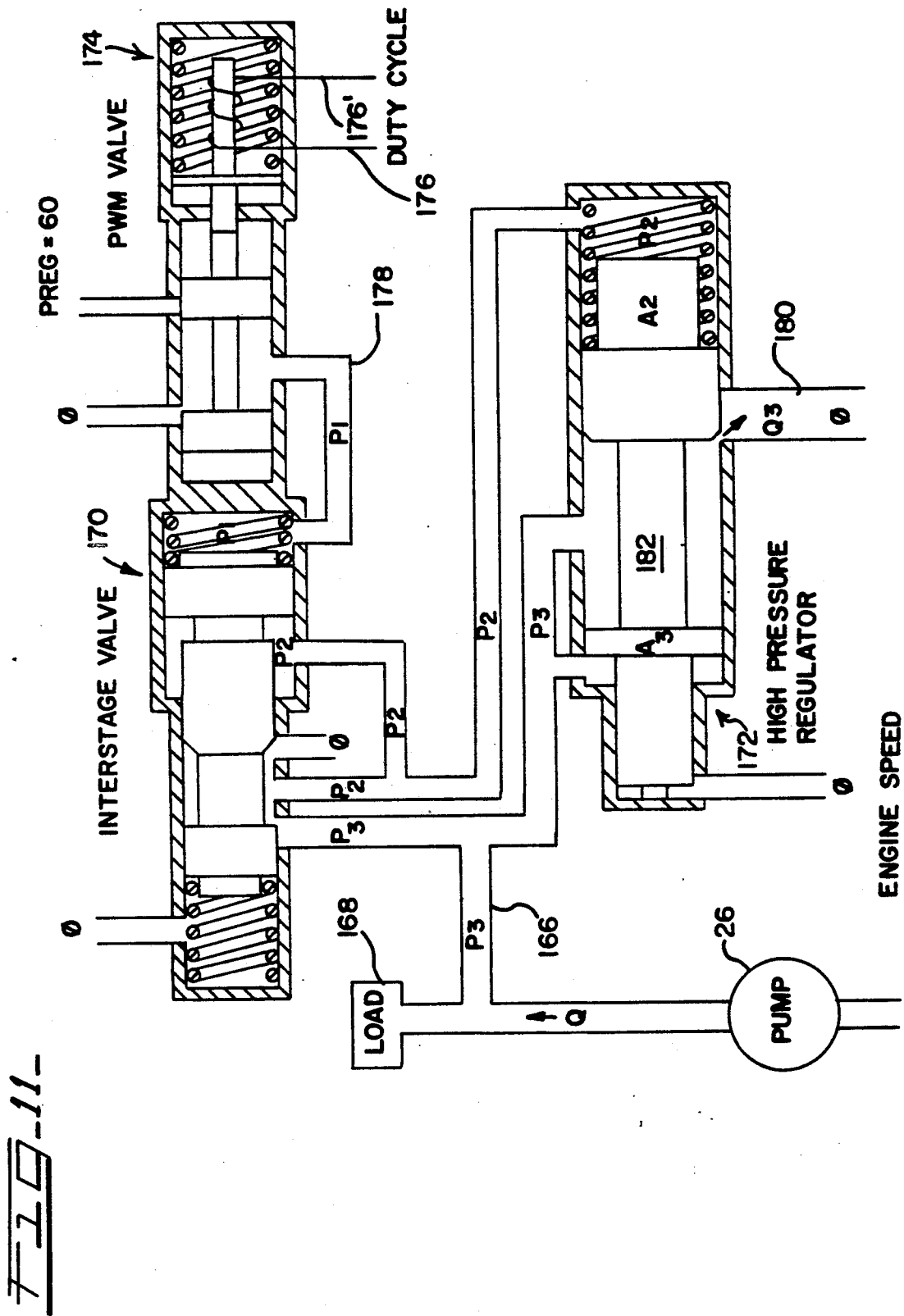

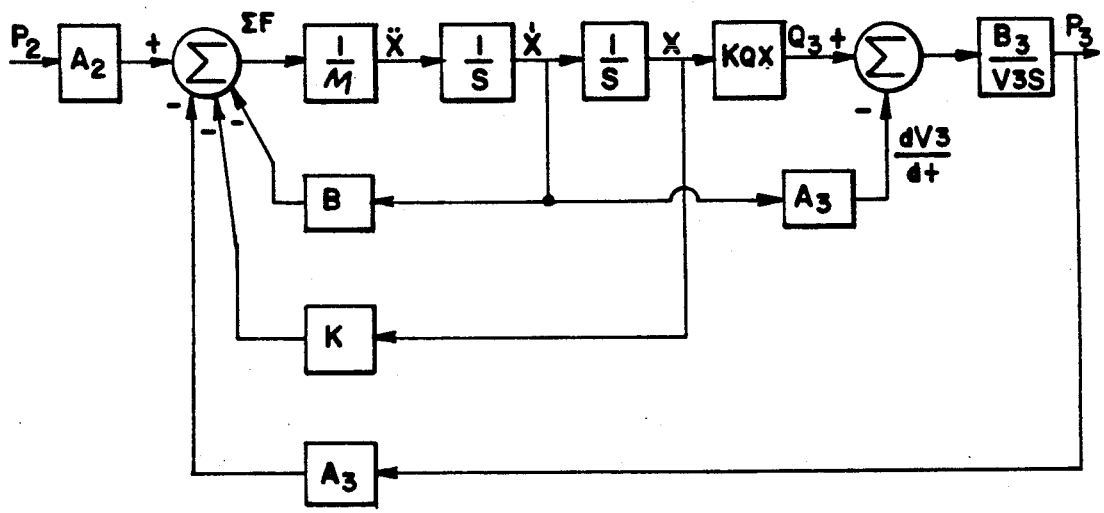
FIG_12_
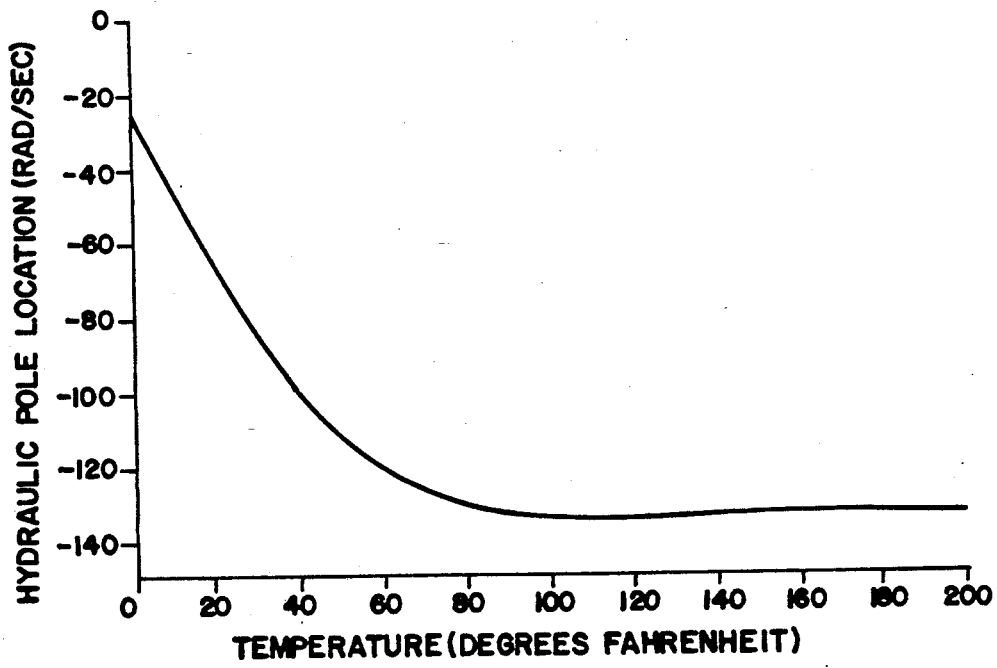
FIG_13_

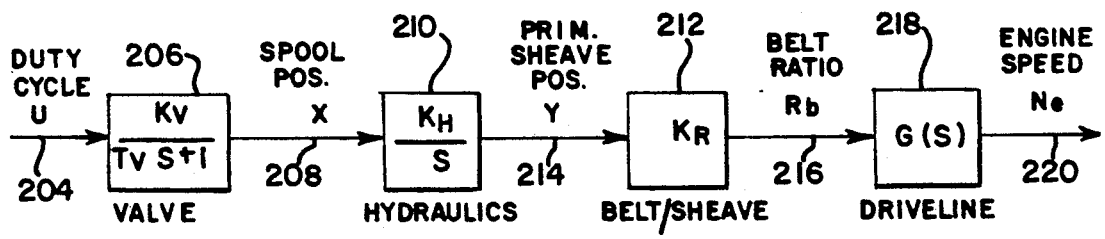
FIG_17_
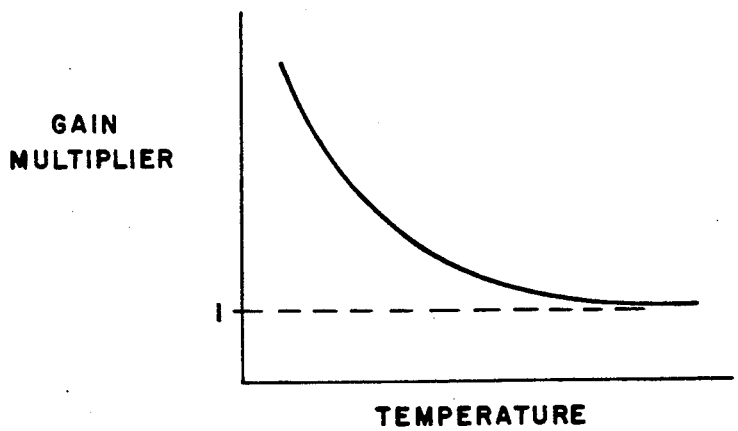
FIG_18_
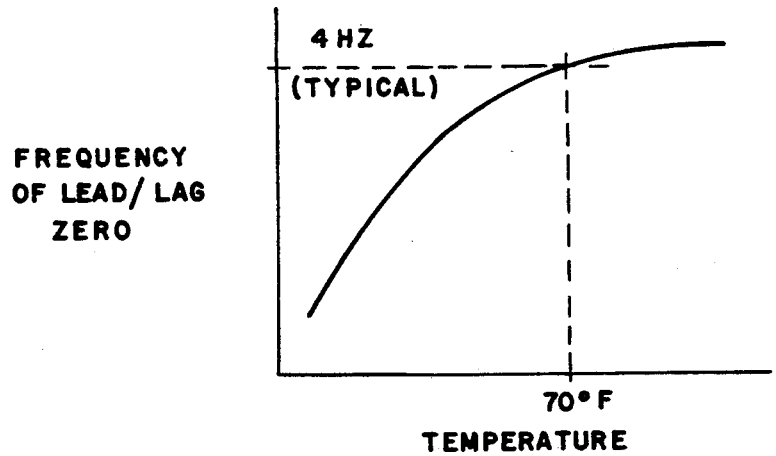
FIG_19_

TEMPERATURE COMPENSATION TECHNIQUE FOR A CONTINUOUSLY VARIABLE TRANSMISSION CONTROL SYSTEM

This application is a continuation of application Ser. No. 370,129, filed June 20, 1989, which is a continuation of Ser. No. 24,392, filed Mar. 13, 1987, now are both abandoned.

BACKGROUND OF THE INVENTION

The present invention generally relates to the continuously variable transmission art. More particularly, the present invention relates to temperature compensation in continuously variable transmissions and to providing temperature compensation to maintain desired system response characteristics for regulating fluid control, clutch control and belt ratio control.

The art contains numerous examples of the operation and construction of continuously variable transmissions (CVT's), e.g., U.S. Pat. No. 4,522,086 and U.S. Pat. No. 4,458,318, entitled Control System for Continuously Variable Transmission, and Control Arrangement for a Variable Pulley Transmission, respectively. These patents, generally describe the mechanics and controls for a CVT system utilizing two adjustable pulleys, each pulley having at least one sheave which is axially fixed and another sheave which is axially movable relative to the first sheave. A flexible belt of metal or elastomeric material intercouples the pulleys. The interior faces of the pulley sheaves are beveled or chamfered. Thus, as the axially displaceable sheave moves relative to the fixed sheave, the distance between the sheaves and, thus, the effective pulley diameter may be adjusted. The displaceable sheave includes a fluid constraining chamber for receiving fluid to move the sheave and thus change the effective pulley diameter; as fluid is exhausted from the chamber, the pulley diameter changes in the opposite sense. Generally, the effective diameter of one pulley is adjusted in one direction as the effective diameter of the second pulley is varied in the opposite direction, thereby effecting a change in the drive ratio between the input shaft coupled to an input pulley and an output shaft coupled to an output pulley. The ratio changes continuously as the pulley diameters vary. Such transmissions frequently are referred to in the art as a continuously variable transmission, CVT.

Through the years various developments have refined and improved the hydraulic control system which is used to pass fluid into the fluid holding chamber of each adjustable pulley. An example of such a hydraulic system is shown in U.S. Pat. 3,115,049—Moars. In that patent, control of the secondary pulley adjustable sheave regulates the belt tension, while a different circuit regulates fluid into and out of the primary sheave to regulate the transmission ratio. U.S. Pat. 4,152,947 van Deursen et al.—also describes control of a CVT. In both systems, the line pressure of the fluid applied to hold the belt tension by pressurizing the secondary chamber is kept at a relatively high value. An improved control system subsequently was developed to reduce the main line fluid pressures supplied to the secondary sheave chamber as a function of torque demand. This improved system is described and claimed in an application entitled "Control System for Continuously Variable Transmission," now U.S. Pat. 4,522,086, assigned to the assignee of this application. Further work resulted in an improved control system which reduced the line pressure applied to the secondary chamber to a lower, safer operating pressure and also provided a lower control pressure for other portions of a hydraulic control system. This system is described in an application entitled "Hydraulic Control System for a Continuously Variable Transmission", Ser. No. 421,198, filed Sept. 22, 1982, which issued Dec. 15, 1987, as U.S. Pat. No. 4,712,453 and assigned to the assignee of this application.

Additional significant advances in CVT control systems have been described and claimed in another application also entitled "Hydraulic Control System for a Continuously Variable Transmission," Ser. No. 717,913, filed Mar. 29, 1985, which issued Jan. 12, 1988 as U.S. Pat. No. 4,718,308, and assigned to the assignee of this application.

Another U.S. Pat. No. 4,648,496, entitled "Clutch Control System for a Continuously Variable Transmission" issued Mar. 10, 1987, further describes control logic techniques for regulating pressure at a clutch in a CVT system to provide the desired torque transfer from an engine to a vehicle drive line. In that system, clutch control focuses on logical recognition of one of a number of operating modes.

A related, co-pending application entitled "Continuously Variable Transmission Clutch Control System", Ser. No. 25,391, filed Mar. 13, 1987, assigned to the assignee of present application discloses an improved clutch controller for use in CVT applications. A second, related, co-pending application entitled "Special Start Technique For Continuously Variable Transmission Clutch Control", Ser. No. 25,476, filed Mar. 13, 1987, assigned to the assignee of the present application, discloses a unique technique for regulating the clutch pressure control signal in a CVT system during selected driving conditions, e.g. skidding on ice.

Another, related, copending application entitled "Ratio Control Technique For Continuously Variable Transmission Systems," Ser. No. 25,389, filed Mar. 13, 1987, assigned to the assignee of the present application, discloses a unique, technique for controlling the transmission belt ratio in a continuously variable transmission system.

The teachings of each of the above referenced patents and applications are incorporated herein by reference in terms of background to the present invention, although none of the previously envisioned systems addresses implementation of the compensation techniques disclosed herein.

CVT systems typically rely upon hydraulic fluid to implement various control function, such as belt ratio control, line pressure control and clutch control. The viscosity and hence the responsiveness of the hydraulic fluid to flow, however, vary substantially over the range of system operating temperatures which may be expected for a typical application of a continuously variable transmission. Variation in the viscosity of the hydraulic fluid results in an undesirable variation in the system response which creates a negative impact on the system operation, reliability and, ultimately, stability.

BRIEF SUMMARY OF THE INVENTION

Accordingly, a principal object of the present invention lies in providing a temperature compensation technique which generally overcomes the deficiencies of the prior art.

A more specific object of the present invention lies in the provision of temperature compensation for individual fluid actuated controls in continuously variable transmission driven vehicles during expected driving temperatures.

Generally, the present invention provides a technique for providing temperature compensation in a continuously variable transmission system. In a system having a controller for providing signals to regulate the fluid transfer which accomplishes the belt ratio control, line pressure control, and the clutch control, the present invention envisions an independent determination of the variation in the transfer function associated with each such fluid control over the range of expected system operating temperatures. These variations may be determined empirically, analytically or by model simulation and stored, or the system conceivably may track the variations as they occur. In operation, the system then senses operating temperature and recalls the previously determined expected variation in the responsiveness indicated by the stored or measured variation in the transfer function. The system then adjusts the controller to compensate for the expected variation based on the sensed temperature.

Additional and further objects and advantages of the present invention will become apparent from the following detailed description and accompanying drawings.

BRIEF DESCRIPTION OF THE FIGURES

The novel features of the present invention are set forth with particularity in the appended claims. The invention, together with the objects and advantages thereof, may be understood more fully by reference to the following detailed description taken in conjunction with the accompanying drawings in which like reference numerals are used to indicate like elements and of which:

FIG. 1 is a block diagram representation of a continuously variable transmission driven system;

FIG. 2 is a block diagram representation of a pressure control loop for clutch control in a continuously variable transmission system;

FIG. 3 is a block diagram of physical elements of a clutch control system in a continuously variable transmission system;

FIG. 4 is a Bode plot illustrating magnitude and phase relationships to frequency for a clutch control system such as that of FIG. 3 at a selected operating temperature;

FIG. 5 is a Bode plot similar to FIG. 4 at a different operating temperature;

FIG. 6 is a flow chart for operation of pressure loop control of clutch pressure in a continuously variable transmission system;

FIG. 7 is an empirical graph of a lead/lag compensation parameter as a function of temperature for use in a clutch pressure loop control for clutch control;

FIG. 8 is an empirical graph of integrator/lead compensation parameter variation as a function of temperature for use in a pressure loop control for clutch control;

FIG. 9 is an empirical graph of a proportional gain parameter as a function of temperature for use in an open loop pressure control for clutch control;

FIG. 10 is a block diagram representation of system elements associated with line pressure regulation in a continuously variable transmission system;

FIG. 11 is a diagram of the physical elements associated with line pressure regulation in a continuously variable transmission system;

FIG. 12 is a linear model block diagram of the physical elements for line pressure regulation, such as those shown in FIG. 11;

FIG. 13 is an empirical graph of the variation in the hydraulic pole location as a function of temperature associated with the line pressure regulation system of FIG. 12;

FIG. 17 is a linearized model of the belt ratio controller physical control element;

FIG. 18 is an empirical representation of a gain multiplier parameter as a function of temperature for use in the belt ratio controller shown in FIGS. 16 and 17; and FIG. 19 is an empirical representation of the variation of the lead/lag pole compensation parameter as a function of temperature in the system of FIGS. 16 and 17.

DETAILED DESCRIPTION OF A PREFERRED EMBODIMENT

Figure 14:
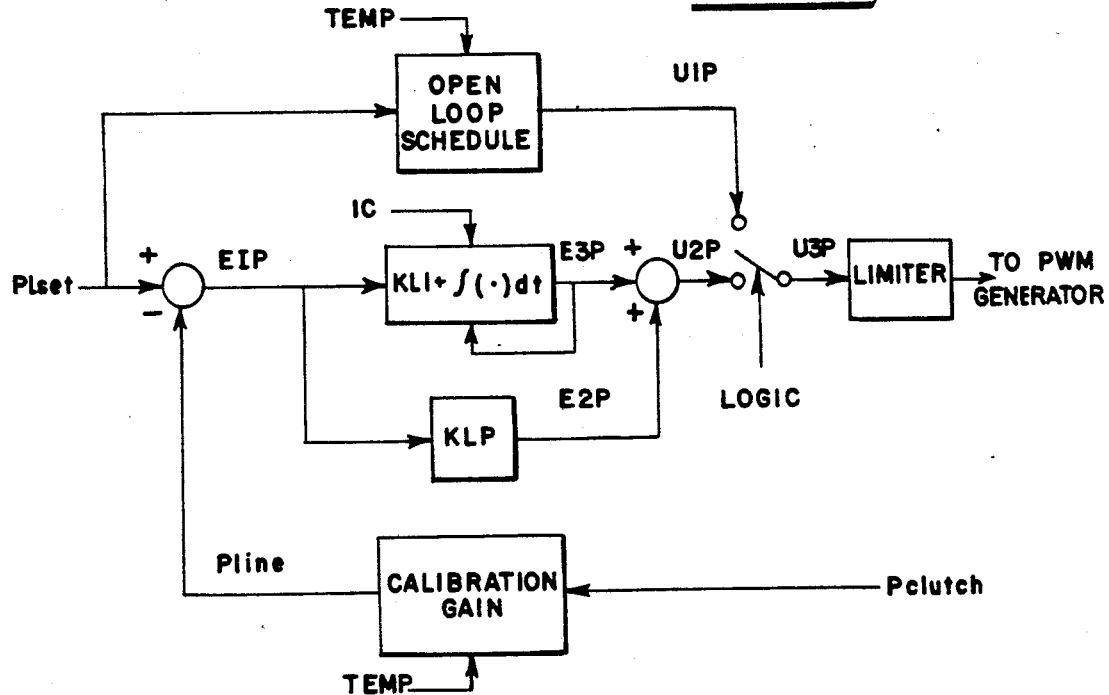
FIG. 14 is a block diagram of a line pressure control system.

As shown in FIG. 1, a throttle signal 10 controls the operation of an engine 12 which transmits torque via a shaft 14 to a primary pulley 16 in a CVT 18. In a typical embodiment, a flywheel and damping arrangement may be included on the shaft 14 between the engine 12 and the primary pulley 16. A metal or elastomeric belt 20 connects the primary pulley 16 to a secondary pulley 22 to transmit torque to a second shaft 24. A pump 26 may also be driven by the first shaft 14 to provide line pressure for the hydraulic system and the controls of the CVT 18.

The second shaft 24 drives the input to a clutch 28 which in turn provides a torque to a third shaft 30. The third shaft 30 drives a reduction differential gear arrangement 32 as a drive line to provide power to the vehicle wheels 34.

In operation, an electronic controller 36 receives a multiplicity of inputs including throttle, engine speed, clutch input speed, clutch output speed, clutch pressure, temperature, driver demand, idle, shift lever and other information input signals as shown at the left of FIG. 1. The electronic controller 36 operates in a logical fashion to provide a ratio control signal on a line 38, a line pressure control signal on a line 40 and a clutch control signal on a line 42. The signal on the line 38 to a ratio control valve 44 controls the hydraulic pressure on a line 46 to the primary pulley 16 of the CVT 18 to control the ratio between the primary pulley 16 and the secondary pulley 22, i.e., the belt ratio. The signal on the line 40 communicates with a line pressure regulator 48 which via a line 50 provides line pressure from fluid flow delivered by the pump 26 to the ratio control valve 44, a clutch control valve 52 and the secondary pulley 22. The output of the line pressure regulator on the line 50 also controls the pressure at the secondary pulley 22 to ensure that the belt 20 does not slip. The output signal on the line 42 to the clutch control valve 52 controls the output of the clutch control valve 52 on a line 54 to the manual and servo valves 56 which controls the fluid flow on the line 58 to the clutch 28. This is the signal which controls or which provides the pressure at the clutch 28 and hence regulates the torque transfer between the second shaft 24 and the third shaft 30.

A shift lever signal on a line 60 provides an additional control of the manual and servo valves 56. When the shift lever signal on the line 60 indicates that the vehicle is in a neutral or park mode, the manual control within the valve arrangement 56 is closed. This prevents fluid from flowing to the clutch 28 and thus prevents any torque transfer through the clutch 28 when the vehicle is in the neutral or park mode.

A first arrow NE (N=speed; E=engine) on the first shaft 14 indicates one acceptable point of measurement for engine speed. A second arrow NCI (CI=clutch input) on the second shaft 24 indicates an acceptable point of measurement for the clutch input speed. A third arrow NCO (CO=clutch output) indicates an acceptable point of measurement for the clutch output speed, which corresponds to vehicle speed. Those skilled in the art will recognize that the various speed values may be accurately obtained at other locations as desired.

The ratio of NE to NCI will correspond to and provide a measure of the transmission belt ratio. The difference between NCI and NCO correspondingly provides a measure of the slippage at the clutch 28. When NCI equals NCO, the clutch 28 locked-up with no slippage.

The lines 46, 50 and 54 shown in FIG. 1 represent lines for fluid flow in the preferred embodiment. At a minimum, the variation in system fluid viscosity over the range of expected system operating conditions can render unsatisfactory the response of the CVT system. The system then may become unusable in some normal operating conditions, unless the response of the system can be made to compensate for the variations, such as fluid viscosity, which are induced by the temperature variations.

Referring now to FIG. 2 therein is shown a block diagram of a pressure loop control for operation of a clutch in a continuously variable transmission system. The system of FIG. 2 responds to a filtered line pressure setpoint at a line 100 ultimately to provide a proportional gain factor at a line 102 to a multiplying junction 104. The system also responds to the clutch pressure setpoint at a line 106 or an external setpoint at a line 108 to provide a closed loop error signal at a line 110. The system of FIG. 2 then performs a lead/lag function at a block 112 and an integrator/lead function at a block 114 to provide an error signal for subtraction from a nominal null signal at a line 116 to provide a output duty cycle signal at a line 118. The operation of the system of FIG. 2 is explained more thoroughly in the related, copending application entitled "Continuously Variable Transmission Clutch Control System," Ser. No. 25,391, and also in related, copending application entitled "Special Start Technique For Continuously Variable Transmission Clutch Control," Ser. No. 25,476, both filed on an even date herewith.

The signal at the line 102 of FIG. 2 represents a proportional gain factor, KAPC, which is a function of line pressure. The signal at the line 118 is a pulse width modulation control signal having a specified duty cycle which is provided to the clutch control valve to create the desired clutch pressure. As explained below, temperature compensation may be introduced into the clutch pressure control system of FIG. 2 through modification of the proportional gain factor KAPC and the function of the lead/lag compensation network 112 and the integrator/lead compensation network 114.

Referring now to FIG. 3, therein is shown a block diagram representation of the valve, clutch and associated hydraulics for the clutch pressure control. This represents a simplified block representation of the physical plant which implements the clutch control system. The pulse width modulation signal is received at a line 120 and the actual clutch pressure is fed back from a pressure transducer 122. A clutch control solenoid 124 operates in conjunction with a clutch control valve 126 in response to control pressure from a line 128 and line pressure from a line 130 to provide fluid flow via a line 132 to the manual and servo valves 134 and 136, respectively. The output of the manual and servo valves 134 and 136 provides a clutch apply pressure at a line 138 to a clutch chamber 140. The operation of this system is described more fully in the co-pending applications and patents referenced above.

Because of the variations in oil viscosity, the response of the valve and associated hydraulics can be expected to be reduced significantly at colder temperatures. At those temperatures, the hydraulic fluid becomes more viscous. Thus, flow through the solenoid valve and the clutch control valve may be reduced undesirably. This reduction of flow relates directly to the reduction in the response of the system.

The system operation may be monitored by conventional techniques, such as a frequency analyzer, to provide the Bode plot of FIG. 4. This represents a measurement of magnitude and phase responses as a function of frequency. The plot of FIG. 4 indicates that the system has an effective bandwidth of nearly sixteen hertz and generally represents a two pole system as indicated by the decay of the phase to $-180°$ at the higher frequencies. The plot of FIG. 4 was generated at a line pressure of 200 psig and a clutch pressure of 100 psig. The oil temperature was approximately 71° F.

Referring now to FIG. 5, therein is shown a Bode plot for the same system with the same parameters but generated at an oil temperature of approximately 14° F. In this plot, it can be seen that the effective bandwidth of the system has diminished to less than four hertz. This was in response to the sole variable change measured by the decrease in temperature from 70° F. to 14° F.

As shown by the graphs of FIGS. 4 and 5, the response of the control valve and associated hydraulics, which form the clutch pressure control plant as illustrated generally in FIG. 3, can be approximated by a second order transfer function. This transfer function is given generally by the following equation (1):

$$G1(S) = \frac{K}{(\tau_2 S + 1)(\tau_2 S + 1)} \quad (1)$$

By performing measurements over a range of temperatures, the time constants $\tau_1$ and $\tau_2$ may be determined as functions of temperature.

Referring again to the block diagram of the system in FIG. 2, the lead/lag compensation network 112 in transfer function form is given by the following formula (2):

$$G2(S) = \frac{\tau_3 S + 1}{\tau_4 S + 1} \quad (2)$$

The integrator lead compensation network 114 may functionally be described by the following formula (3):

$$G3(S) = \frac{1}{\tau_5} \frac{\tau_5 S + 1}{S} \quad (3)$$

The overall operation of a pressure loop control system may be described generally by the flow chart of FIG. 6, which is described in more detail in the related, copending application entitled "Continuously Variable Transmission Clutch Control System," referenced above.

The first pole indicated by the equation (1) may be thought of as representing the hydraulic response variation in the system plant. The second pole may be correspondingly thought of as the variation in the control valve dynamics in the physical plant.

The lead compensation in the controller, embodied in the lead/lag function 112 and the integrator/lead function 114 may be adjusted as the temperature decreases to compensate for the hydraulic and the control valve dynamic poles generally by equation (1). Generally, the lead/lag function 112 may be made to compensate for the hydraulic pole, while the integrator/lead function 114 may be made to compensate for the second, control valve dynamics, pole.

This may be done by adjusting the compensation zeros, given by time constants $\tau_3$ and $\tau_5$ in equations (2) and (3), to track the poles of the plant response, given by time constants $\tau_1$ and $\tau_2$ in equation (1). In this fashion, an approximate cancellation of the poles associated with the plant dynamics may be achieved by modification of the controller compensation zeros.

The time constant $\tau_4$ is not made a function of temperature, but remains constant throughout the operation of the system. As explained in conjunction with the previous applications, this time constant $\tau_4$ may be chosen to have a sufficient value so as not to produce any practical impact on the operation of the system.

The controller proportional gain, KAPC, also must be adjusted as a function of temperature to maintain a constant, open loop gain in the clutch pressure loop. As the integrator/lead pole is pushed out to compensate for temperature variations, a need is created for a correction in the system response. This may be achieved through modification of the proportional gain factor. Accordingly, KAPC increases in the system of the preferred embodiment as the temperature decreases.

Referring again to FIG. 6, it can be seen that the lead/lag compensation network 112 and the integrator/lead compensation network 114 are implemented in the digital controller by means of difference equations. Generally, the operation of the lead/lag compensation network may be implemented by the following equations (4) and (5):

$$E3PC(n) = CPDC(E2PC(n) - X1PCD(n)) + X1PDC(n) \quad (4)$$

$$X1PDC(n+1) = -BPDC(E2PC(n) - X1PDC(n)) + E2PC(n) \quad (5)$$

Generally, the operation of the integrator/lead compensation network 114 may be given by the following equations (6) and (7):

$$E4PC(n) = X2PIC(n) = E3PC(n) \quad (6)$$

$$X2PIC(n+1) = X2PIC(n) + DPIC \times E3PC(N) \quad (7)$$

The parameter BPDC of equation (5) in the lead/lag difference equations determines the time constant $\tau_4$. As mentioned, this remains constant with the temperature.

The lead/lag parameter CPDC of difference equation (4) determines the time constant $\tau_3$, and the integrator/lead parameter DPIC establishes a time constant $\tau_5$. Scheduling the values of these parameters as a function of temperature provides one method for compensating for the variation in the plant response created by variations in the operating temperature.

As mentioned above, a frequency analyzer may be used to obtain a transfer function through cross correlation to provide a Bode plot of magnitude and phase for system operation at the entire range of expected operating temperatures.

The necessary increase in the lead/lag parameter CPDC as temperature decreases and the decrease in the integrator/lead parameter DPIC as temperature decreases may be scheduled as a function of temperature.

FIG. 7 illustrates a temperature schedule for the lead/lag parameter CPDC. Accordingly, in operation the system senses the operating temperature and retrieves the corresponding CPDC value for use in the lead/lag compensation calculations.

FIG. 8 represents a corresponding temperature schedule for the integrator/lead parameter DPIC. Accordingly, after the system senses the operating temperature, it retrieves the corresponding DPIC value for use in the integrator/lead compensation calculations.

Correspondingly, the necessary increase in the proportional gain factor KAPC may be scheduled as a function of temperature. This is illustrated in the graph of FIG. 9. Thus, after the operating temperature is sensed, the system obtains the proportional gain factor from the illustrated schedule.

It should be appreciated that the schedules illustrated in FIGS. 7, 8 and 9 are determined from system measurements for a selected embodiment of a continuously variable transmission system over a chosen set of expected operating temperatures. These values must be viewed as qualitative in terms of the particular embodiment. Modifications and variations in actual quantitative values should be expected for use in actual CVT systems over the expected range of temperature variation.

Generally, the above provides a technique for temperature compensation in a clutch pressure control system. The variations in system response are measured as a function of temperature and an associated approximate transfer function generated. Variations in the poles associated with the transfer function at particular temperatures may then be compensated for through corresponding empirical measurements or analytical determinations and implemented through the lead/lag compensation network 112 and the integrator/lead compensation network 114. The proportional gain factor may also be adjusted to maintain a constant overall system gain for the desired response.

It is not envisioned that temperature compensation is required in the outer engine speed loop, which normally is used in the clutch control system during normal start mode.

Referring now to FIG. 10, therein is shown a simplified block diagram of the system illustrated in FIG. 1. Specifically, a line pressure regulator 150 receives fluid from a pump 26 and provides a fluid pressure to a secondary sheave 22, a ratio control valve 44 and a clutch control valve 52 for operations explained above. The line pressure regulator 150 is controlled by a pulse width modulation signal from a PWM generator 152. The PWM generator 152 is controlled by a line pressure controller 154, which is a logical subpart of the electronic controller 36 of FIG. 1. The line pressure controller 154 receives mode information from a line 156, temperature information from a line 158, line pressure setpoint information from a line 160 and clutch pressure information from a line 162 by means of a pressure transducer 164 connected to the output of the clutch control valve. For further reference, it should be recognized that the output of the pressure transducer 164 will provide a signal representative of the same pressure as that in the line 50, i.e.. line pressure, which connects the line pressure regulator 150 to the ratio control valve 44 in the clutch control valve 52 as long as the clutch is in a full locked-up mode and the clutch control valve is fully open to line pressure.

Referring now to FIG. 11, therein is shown a more detailed diagram of the line pressure regulator 150. Generally, the pump 26 provides a fluid flow, Q, at a line 166. A load representative of system flow demands 168 is provided also. The line 166 communicates the line pressure $P_3$ which results from the pump flow minus the load flow and regulator dump flow, $Q_3$, to the interstage valve 170 and to the high pressure regulator 172. A PWM valve 174 receives the pulse width modulation duty cycle signal via the lines 176 and 176'. Generally, the PWM valve 174 supplies fluid in response to the control duty cycle signal via a line 178. This fluid flow develops pressure $P_1$, which drives the interstage valve 170 to provide a controlled pressure, $P_2$, to the high pressure regulator 172. This pressure, $P_2$, generally drives the high pressure regulator 172 to permit flow from the line 166 to an output line 180 as a regulator dump flow $Q_3$ which is subtracted from the pump and load flow to provide and control line pressure $P_3$. The operation of the physical valves illustrated in FIG. 11 may be more fully understood from the previous, referenced applications, the teachings of which have been incorporated herein by reference.

For purposes of variations with temperature, the interstage valve and the PWM valve 174 are ignored since the main regulator is the source of the slower dynamics. Accordingly, temperature compensation for the line pressure regulation in the system of the present invention focuses upon the high pressure regulator 172. The regulator and associated hydraulics may be approximated by a third order system. The mechanical poles of the regulator spool 182 comprise a second order system, while the hydraulics represent a first order flow-to-pressure relationship.

FIG. 12 represents a linearized model for the high pressure regulator 172 of FIG. 11. The values illustrated in FIG. 11 represent various parameters for the physical system given by the following table:

TABLE I

| | | |
|---|---|---|
| $P_2$ | = | Pilot Pressure from Interstage Valve 170 |
| $A_2$ | = | $P_2$ Area of high Pressure Regulator Spool 182 |
| M | = | Mass of High Pressure Regulator Spool 182 |
| B | = | Damping Factor |
| K | = | Spring Constant |
| $\ddot{x}$ | = | Spool 182 Acceleration |
| $\dot{x}$ | = | Spool 182 Velocity |
| x | = | Spool 182 Displacement |

TABLE I-continued

| | | |
|---|---|---|
| $K_{qx}$ | = | Flow Gain = $f(T)w\sqrt{P_3}$ |
| $\omega$ | = | Flow Gradient of Regulator 172 |
| $\beta$ | = | Bulk Modulus |
| $V_3$ | = | Nominal Volume of Hydraulic load 168 |
| $P_3$ | = | Line Pressure |
| $A_3$ | = | $P_3$ Area at Regulator Spool 182 |
| $Q_3$ | = | Output Flow |
| f(T) | = | Function of Temperature |

The linearized model of the FIG. 12 operates as indicated therein upon the values given by Table I. As can be seen by Table I, the major temperature dependent parameter in the system is the flow gain of the valve given by the term Kqx. This parameter relates to the physical position of the valve spool 182 to flow. As the temperature of the hydraulic fluid decreases, the resistance of the fluid to flow increases. Thus, the flow gain has an inverse relationship to temperature.

The effect of temperature on the flow gain mainfests itself in the location of the hydraulic pole, the first order flow-to-pressure relationship mentioned above, which moves closer to the origin of the "S" plane as the temperature decreases. The second order spring-mass-damper system associated with the mechanical poles of the spool are considered to be virtually unaffected by temperature. Accordingly, temperature compensation for the line pressure regulator will focus on the flow gain factor.

This has been verified by simulated system response over temperature based upon the linearized model of FIG. 12. In this simulation, only the hydraulic pole associated with the flow gain was affected significantly over the entire range of expected operating temperatures.

Accordingly, FIG. 13 represents the hydraulic pole location associated with the flow gain factor as a function of temperature.

FIG. 14 represents a block diagram of a system for line pressure control as generally described more fully in a previous application entitled "Control System for Controlling the Line Pressure in a Continuously Variable Transmission", Ser. No. 936,527, filed Dec. 1, 1986, and incorporated herein by reference. The operation of FIG. 14 may generally be given by the following equation (8):

$$U2P = K_{lp}\frac{(S + Wlead)}{S} EIP \quad (8)$$

Where $\omega lead = Kli/Klp$
$K_{lp}$ = proportional gain
$K_{li}$ = integrator gain Accordingly, $K_{li}$ and $K_{lp}$ may be derived to yield the desired response at a particular operating temperature. The proportional term may then be used to adjust ωlead to cancel approximately the effect of the hydraulic pole. Thus, varying the proportional gain term Kp maintains the desired system response as the temperature varies. The integrator gain, $K_{li}$ remains constant as a function of temperature.

Figure 15:
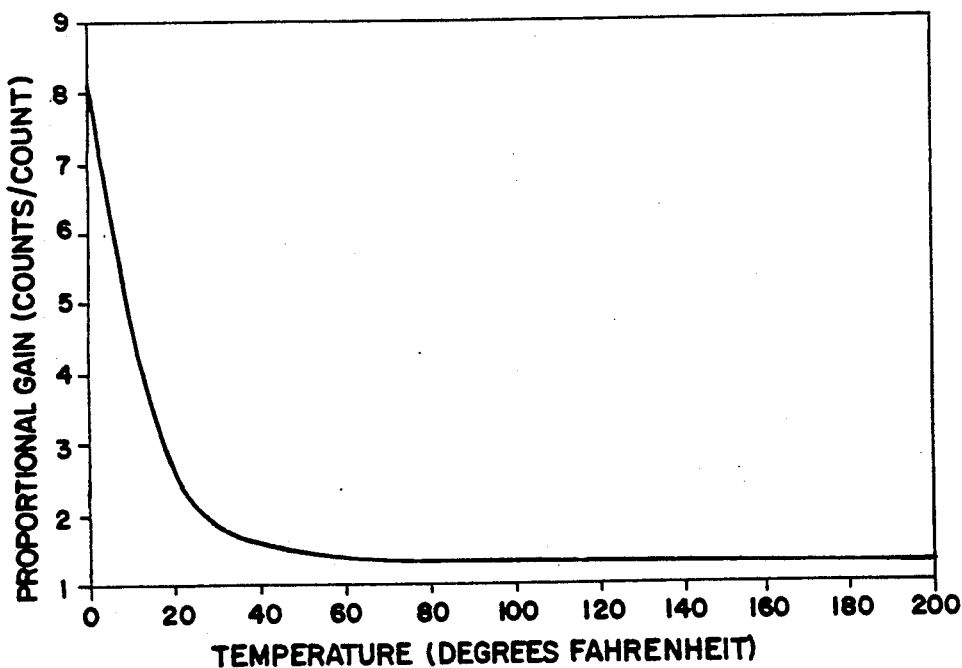
FIG. 15 is an empirical graph of the variation of a proportional gain parameter as a function of temperature in a line pressure regulator system such as that of FIG. 14.

The graph of FIG. 15 represents a schedule for the proportional gain as a function of temperature. This is then utilized at the Klp block for the closed loop control of FIG. 14. By adjusting ωlead through adjustment of proportional gain, the hydraulic pole of the system is tracked as a function of temperature. Also, the open loop gain of the system remains constant throughout the modification of the lead compensation factor. Accordingly, the line pressure regulator may be compensated for variations of temperature as desired in accordance with the present invention.

Figure 16:
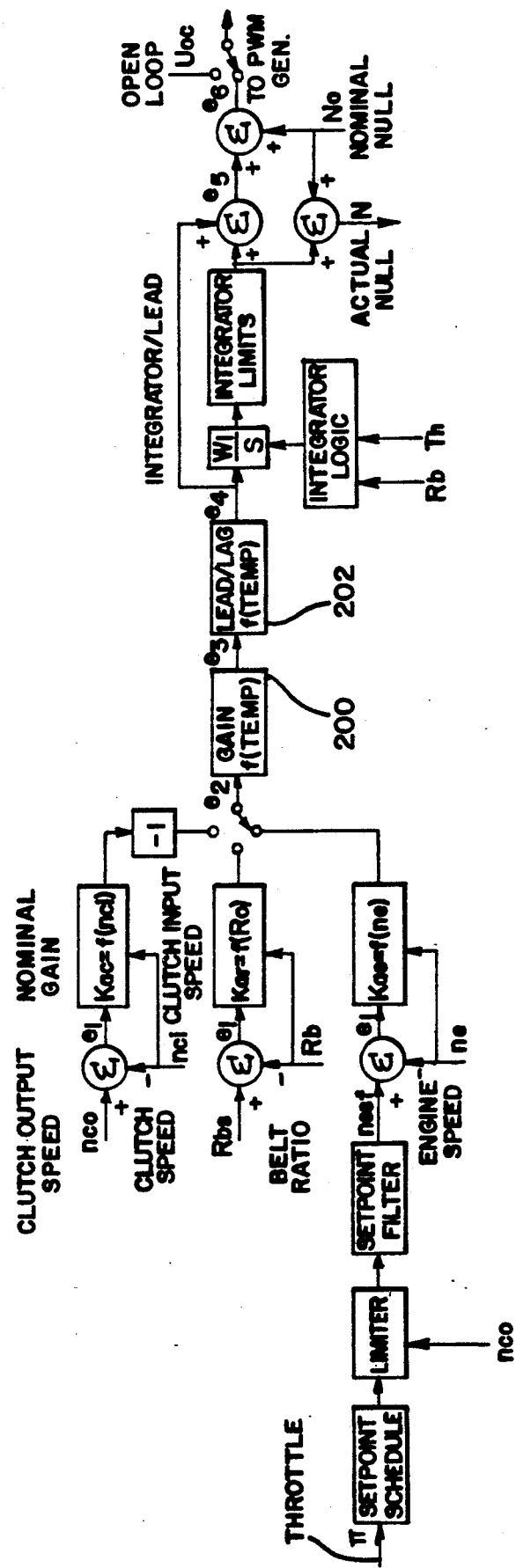
FIG. 16 is a block diagram of a belt ratio controller for use in a continuously variable transmission system according to the present invention.

Referring now to FIG. 16, therein is shown a block diagram for performing a ratio control technique. The operation of the system illustrated in FIG. 16 is described more fully in the related copending application entitled, "Ratio Control Technique for Continuously Variable Transmission Systems," Ser. No. 25,389. However, a variable gain function 200 and a lead/lag compensation function 202 have been added to the system of FIG. 16 to provided for desired temperature compensation in accordance with the present invention. Again, the temperature compensation is designed to counteract the loss of response in the hydraulics of the system corresponding to a decrease in temperature.

As explained in the related applications, the ratio controller outputs a pulse width modulated control signal to the ratio control valve. The valve consists of a first stage solenoid valve and a second stage closed center spool valve. The control valve regulates the flow to the primary sheave actuator, where the resultant fluid pressure determining the CVT belt ratio.

The simplified dynamics of the ratio control plant are shown by the block diagram of FIG. 17. The plant consists of the hydraulic response of the ratio control valve and sheave actuator in response to the duty cycle signal from a line 204, the valve characteristics are given at the block 206. The hydraulics function is based on spool position X from a line 208 as given at a block 210. The belt/sheave transfer function at a block 212 is based on the primary sheave position Y at a line 214. The primary sheave function controls the belt ratio at a line 216 which through a drive line system 218 provides the engine speed at a line 220. Accordingly, FIG. 17 represents a linear model of the ratio control plant.

The parameters of the linear model illustrated in FIG. 17 which are most affected by temperature are the valve constant $\tau V$ and the hydraulic gain $K_H$ illustrated at blocks 206 and 210, respectively. As explained above, the decrease in temperature causes a reduction of flow, because of an increase in oil viscosity. The time constant $\tau V$ is inversely proportional to the flow gain of the solenoid valve. The flow gain of the solenoid valve decreases as the temperature decreases. Accordingly, the time constant $\tau V$ increases as the temperature decreases. Conversely, the hydraulic gain factor KH is directly proportional to the flow gain of the second stage spool valve. Accordingly, the hydraulic gain KH decreases as temperature decreases.

To provide for temperature compensation then in the ratio control system, the pole of the lead/lag function 202 remains at a fixed frequency chosen to be sufficient so as not to have a practical impact on the operation of the system. In contrast, the zero of the lead/lag compensation network 202 tracks the control valve time constant $\tau V$. As explained, $\tau V$ increases as the temperature decreases. Accordingly, the zero of the lead lag compensation network 202 shifts to lower frequencies as the temperature decreases.

The gain multiplier network 200 maintains a constant open loop gain while compensating for changes in the hydraulic gain KH. Accordingly, the gain multiplier at block 200 must increase as the temperature decreases.

Frequency response measurements in a conventional fashion for an actual CVT system may be utilized to derive schedules for the temperature compensation parameters discussed above.

The gain multiplier at block 200 may be implemented as a normalized function of temperature. This is shown generally by the graph of FIG. 18, in which the gain multiplier has a unity value at some reference temperature. As the temperature decreases, the gain multiplier increases accordingly to the empirically or analytically determined values necessary to maintain overall system gain.

FIG. 19 generally illustrates the frequency location of the lead/lag compensation network 202 as a function of temperature. At a specific reference temperature, for example 70° F., the lead/lag zero is set to the same frequency as the lead/lag pole. Again, this frequency is chosen to have a sufficient magnitude so as not to have a practical impact upon operation of the system. However, as temperature decreases, lead compensation becomes a significant factor in system operation as the lead/lag zero tracks the valve pole.

Implementation of the lead/lag compensation in a digital controller has been explained above in terms of the difference equations set forth in the clutch control section of this application. Modification of those equations for utilization in the ratio control system of FIG. 16 is deemed to be within the ordinary skill in the art.

It should be appreciated that the present invention has been implemented for clutch control, line pressure control and ratio control in a continuously variable transmission system. Three separate approaches have been utilized to achieve the desired temperature compensation in these three systems, and each has achieved the same result. Specifically, in the clutch control system, actual system response measurements were utilized to provide the desired schedule for variation of the integrator/lead, lead/lag and proportional gain parameters. In the line pressure regulator, simulation techniques were utilized to provide the corresponding gain schedule as a function of anticipated operating temperature. Finally, in the ratio control valve, analytical techniques were utilized to provide a linearized model which may be operated as taught by the previously discussed techniques to generate the appropriate gain multiplier and lead/lag zero schedules as a function of expected operating temperature. Accordingly, the operation of the present invention is deemed to be equally applicable to any of the three methods to provide the overall compensation technique generally performed by tracking variations in system transfer function based on variations in system operating temperature.

The present invention has been described above in terms of a number of preferred embodiments and the features thereof. Those features which are deemed to be novel are set forth with particularity in the appended claims. Such modifications and alterations as would be apparent to one of ordinary skill in the art and familiar with the teachings of this application also should be deemed to fall within the spirit and scope of the present invention. Interconnections between the system of the present invention and other elements for use in a continuously variable transmission system or other system and the specific program instructions based on the accompanying flow charts are deemed to be within the ordinary skill of the art.

What is claimed is:

1. A method for adjusting a continuously variable transmission system having regulating means for regulating fluid transfer, where the fluid transfer is used to provide belt ratio control, line pressure control and clutch control, so that the operation of said continuously variable transmission system is substantially consistent at any system operating temperature, including;
   sensing the system operating temperature;
   independently determining variations caused by system operating temperature in said regulating means for regulating fluid transfer used to provide belt ratio control, line pressure control and clutch control;
   storing said independently determined variations; and
   adjusting said regulating means for regulating said fluid transfer and thereby to adjust said fluid transfer for said stored independent variations at said sensed operating temperature to provide substantially consistent operation of said continuously variable transmission system at any system operating temperature.

2. A method for providing consistent operation of a continuously variable transmission system having certain system operating parameters controlled by fluid transfer at any operating temperature by adjusting the system operating parameters in accordance with the operating temperature, including:
   measuring the system operating temperature;
   determining the operation of said system based on said sensed system operating temperature;
   comparing said determined operation of said system to a reference; and
   modifying the fluid transfer rate of one or more of said system operating parameters to provide consistent belt ratio and compensate for any system response variations detected in the comparing step to provide substantially consistent operation of said continuously variable transmission system at any system operating temperature.

3. A method for adjusting a transmission control system having regulating means for regulating fluid transfer used to provide belt ratio control and line pressure control, so that the operation of said continuously variable transmission system is substantially consistent at any system operating temperature, including the steps of:
   sensing the system operating temperature;
   providing reference fluid transfer rates respectively associated with belt ratio control and line pressure control;
   providing compensatory fluid transfer rates respectively associated with belt ratio control and line pressure control and dependant upon said sensed system operating temperature; and
   adjusting said fluid transfer rate respectively associated with belt ratio control and line pressure control to compensate control system operation for variations caused by system temperature in accordance with said compensatory fluid transfer transfer rates so as to provide substantially consistent system operating performance at any sensed system operating temperature.

4. The method of claim 3 in which the transmission control system has means to provide clutch control, and further including the steps of providing a reference fluid transfer rate associated with said means to provide clutch control, and providing a compensatory fluid transfer rate associated with clutch control dependent upon said sensed system operating temperature.

5. In a continuously variable transmission system having regulating means for regulating fluid transfer, where the fluid transfer is used to control system performance, a method for providing consistent system performance under varying temperature conditions comprising:
   monitoring system performance to establish desired system performance characteristics;
   sensing the system operating temperature; and
   regulating fluid transfer used to control said continuously variable transmission system performance in response to said sensed system operating temperature to achieve said desired system performance characteristics at any system operating temperature wherein said step of regulating fluid transfer comprises varying a fluid transfer rate for line pressure control in response to said sensed system operating temperature in accordance with predetermined line pressure performance characteristics as a function of temperature to maintain said desired system performance characteristics.

6. The method of claim 6 wherein said step of varying a fluid transfer rate for said line pressure control comprises adjusting a transfer function associated with said line pressure control.

7. The method of claim 5, wherein said step of regulating fluid transfer comprises varying a fluid transfer rate for clutch control in response to said sensed system operating temperature in accordance with predetermined clutch performance characteristics as a function of temperature to maintain said desired system performance characteristics.

8. The method of claim 7 wherein said step of varying a fluid transfer rate for said clutch control comprises adjusting a transfer function associated with said clutch control.

9. In a continuously variable transmission system having regulating means for regulating fluid transfer, where the fluid transfer is used to control system performance, a method for providing consistent system performance under varying temperature conditions comprising:
   monitoring system performance to establish desired system performance characteristics;
   sensing the system operating temperature; and
   regulating fluid transfer used to control said continuously variable transmission system performance in response to said sensed system operating temperature to achieve said desired system performance characteristics at any system operating temperature wherein said step of regulating fluid transfer comprises varying a fluid transfer rate for belt ratio control in response to said sensed system operating temperature in accordance with predetermined belt ratio performance characteristics as a function of temperature to maintain said desired system performance characteristics.

10. The method of claim 9 wherein said step of varying a fluid transfer rate for said belt ratio control comprises adjusting a transfer function associated with said belt ratio control.

11. In a continuously variable transmission system having regulating means for regulating fluid transfer, where the fluid transfer is used to control system performance, a method for providing consistent system performance under varying temperature conditions comprising:

monitoring system performance to establish desired system performance characteristics:

sensing the system operating temperature; and regulating fluid transfer used to control said continuously variable transmission system performance in response to said sensed system operating temperature to achieve said desired system performance characteristics at any system operating temperature wherein said step of regulating fluid transfer comprises independently adjusting the fluid transfer rates for belt ratio control, line pressure control and clutch control in response to said sensed system operating temperature in accordance with predetermined belt ratio, line pressure and clutch performance characteristics as a function of temperature to maintain said desired system performance characteristics.

12. The method of claim 11 wherein said step of independently adjusting the fluid transfer rates comprises adjusting transfer functions associated with said belt ratio control, line pressure control and clutch control.

13. A method for regulating fluid transfer used to provide belt ratio control and line pressure control in a transmission control system so that the operation of said continuously variable transmission system is substantially consistent at any system operating temperature including:

storing a separate schedules of transfer function representation of the performance or belt ratio control and line pressure control as a function of operating temperature;

sensing the system continuously variable transmission operating temperature;

adjusting fluid transfer rates for said belt ratio control and line pressure control in accordance with said stored transfer function schedules and said sensed system operating temperature so that said operation of said continuously variable transmission system is substantially consistent at any system operating temperature.

14. The method of claim 13 wherein said step of adjusting fluid transfer rates comprises adjusting the transfer function for belt ratio control and line pressure control to provide substantially unchanged system performance for every sensed operation temperature.

15. The method of claim 13 further including:

generating a schedule of transfer function representation of the performance of clutch control in response to variations in operating temperature; and adjusting the fluid transfer rate for said clutch control in accordance with said generated clutch control transfer function schedule and said sensed system operation temperature.

* * * * *